:::

United States Patent [19]

Faughn

[11] Patent Number: 6,050,822
[45] Date of Patent: Apr. 18, 2000

[54] ELECTROMAGNETIC LOCOMOTION PLATFORM FOR TRANSLATION AND TOTAL IMMERSION OF HUMANS INTO VIRTUAL ENVIRONMENTS

[75] Inventor: Jim A. Faughn, Bel Air, Md.

[73] Assignee: The United States of America as represented by the Secretary of the Army, Washington, D.C.

[21] Appl. No.: 08/942,193

[22] Filed: Oct. 1, 1997

[51] Int. Cl.$^7$ .................................................. F41A 33/00
[52] U.S. Cl. .............................. 434/11; 434/16; 434/247; 434/307 R; 482/54; 482/902; 345/952; 345/425
[58] Field of Search ................................. 434/11–17, 19, 434/21, 22, 27, 247, 253, 255, 307 R, 308, 365; 482/4, 8, 52, 54, 70, 79, 900–902; 198/779; 73/379.01; 463/1, 31, 36, 42; 472/60, 130; 395/500.27, 500.28, 500.34, 500.41; 345/302, 473, 121, 145, 952, 425; 266/48, 49; 406/177

[56] References Cited

U.S. PATENT DOCUMENTS

| | | | |
|---|---|---|---|
| 4,003,830 | 1/1977 | Schloemann | 406/177 |
| 4,682,953 | 7/1987 | Doerfel et al. | 434/16 |
| 5,490,784 | 2/1996 | Carmein | 434/307 R X |
| 5,562,572 | 10/1996 | Carmein | 482/54 X |
| 5,577,981 | 11/1996 | Jarvik | 482/902 X |
| 5,580,249 | 12/1996 | Jacobsen et al. | 434/11 |
| 5,690,491 | 11/1997 | FitzGerald et al. | 434/22 X |
| 5,811,055 | 9/1998 | Geiger | 266/49 |
| 5,846,134 | 12/1998 | Latypov | 463/46 |
| 5,902,214 | 5/1999 | Makikawa et al. | 434/247 X |
| 5,913,684 | 6/1999 | Latham et al. | 434/247 |

Primary Examiner—Joe H. Cheng
Attorney, Agent, or Firm—Paul S. Clohan, Jr.

[57] ABSTRACT

The present invention, an Electromagnetic Locomotion Platform (ELP) system, is an electronically powered device which allows human-like activities to be performed in all three axes: x, y, & z, in a confined and localized area for the purpose of attaining total immersion (both visual and physical) into Virtual Environments. The ELP system allows humans the ability to walk, jog, run, crawl, etc. in a stationary position, thus the user can "walk forever to nowhere", similar to the basic function of a treadmill. This feature can be enhanced by having the user wear a helmet mounted display (HMD) which is coupled to a computer generated Virtual Reality (VR) system. The VR system provides external environments to the HMD and when synchronized with the movements of the individual on the ELP, it displays visual changes in the surrounding environment according to the movements generated by the user. This is a system which then can totally immerse someone into a Virtual Environment by allowing body movement to dictate visual changes in the environment, yet keep the subject in essentially the same location. In addition to the visual immersion capability, the ELP also has the ability to physically immerse humans by generating and applying resistive forces which will cause the body to work, this energy expenditure replicates the physical loads experienced by the body in the real world.

14 Claims, 8 Drawing Sheets

ELECTROMAGNETIC LOCOMOTION PLATFORM FOR TRANSLATION AND TOTAL IMMERSION OF HUMANS INTO VIRTUAL ENVIRONMENTS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to a means by which individuals can experience both Visual and Physical immersion (i.e., Total Immersion) into Virtual Environments (VEs) by performing human locomotive characteristics such as walking, running, crawling, jumping, climbing, etc. in a stationary or confined space while visually interacting with a Virtual Reality (VR) system and physically interacting with the Electromagnetic Locomotion Platform (ELP).

VR has been proven to be a very useful and beneficial science and currently is being used to help people overcome the fear of heights, fear of flying, and as training devices for pilots of all kinds of vehicles; tanks, planes, helicopters, etc. Current VR systems are used to allow pilots of vehicles the ability to totally immerse into VEs. These pilots are fortunate because the three most critical senses required for total immersion are already built into the vehicle itself. Sight, sound, and touch are the three most critical—smell and taste could also be considered but are more of a fine sensory stimulus and are to be considered as having a secondary level of impact on the human's immersion believeability factor. For example, all of the following components are necessary for a human to operate a vehicle in the real world:

a) Vehicle—contains the cockpit and permits freedom of movement over terrain or through space depending upon vehicle capabilities (Touch).

b) Cockpit—is the operators compartment in the vehicle and contains all control functions for manipulation of the vehicle in it's environment (Touch).

c) Controls—allows the pilot to input control commands for operation of the vehicle (Touch, Sight & Sound).

d) Windshield—is the pilots window to the external environment and allows him to make decisions for control input based on visual stimulus from the outside environment (Sight).

e) Support Systems—includes all computers, control systems and subsystems, and physics based devices which provide all the ancillary functions to operate the entire vehicle from the operators commands and physical limitations of the vehicle (Sight, Sound & Touch).

As is evident in the above example, for a VE dealing with a human inside a vehicle, all of the interfaces are provided for just by the nature of the situation; the human is stationary in the cockpit of the vehicle, has a graphical interface around him (windscreen, canopy, vision blocks, and the like), and has controls within his reach for manipulation of the vehicle through the VE. However, when trying to replicate these same functions for an infantryman or human navigating over the ground who has no stationary cockpit, no graphical interface (windshield), no control mechanisms, and no vehicle support systems; the problem of immersing this individual becomes much more complicated. A review of the same components for the infantryman as compared to a human operated vehicle breaks out as the following:

a) Vehicle=Mobility Platform: A device which allows the human to have all of their locomotion activities done in one location and allows the human to interact with a VE (Touch).

b) Cockpit=Human Interactive Zone: The human itself is basically the cockpit, because of the controls located on the body and in the Human Interactive Zone (HIZ) (area where the human can perform mobility functions and remain within the control parameters and boundaries of the VE system) (Touch).

c) Controls=Controls: Instead of the controls being mounted to the vehicle they are now an integral part of the human or are located in, on, and/or around the HIZ (Touch, Sight, & Sound).

d) Windshield=Visual Interface: This can be any number of devices such as a Helmet Mounted Display (HMD), rear projection screen, or any means of displaying graphical information to the human's visual senses (Sight).

d) Support Systems=Support Systems: Includes all computers, control systems and subsystems, and all mechanical, electrical, physics based, etc. devices which provide all the ancillary fuinctions to operate the entire VB system i.e.; providing graphics, logic controls, motion controls, timing, sequencing, etc. (Sight, Sound & Touch)

Current technology can provide a fairly good graphical or visual interface by using HMDs or other devices as previously mentioned, the real problem is to provide the foot soldier with a platform and controls. The infantryman is mobile, not confined to a cockpit, and is able to perform a multitude of different physical locomotion movements—his platform is essentially the ground he stands on. Controls for the foot soldier do not exist—he does not interface with any ancillary equipment to move about, he uses his brain and limbs to navigate and be mobile on the battlefield.

BRIEF SUMMARY OF THE INVENTION

It is therefore an object of the present invention to provide a means by which individuals can experience both Visual and Physical immersion into VEs by performing human locomotive characteristics such as walking, running, crawling, jumping, climbing, etc. in a stationary or confined space while visually interacting with a VR system and physically interacting with a mobility platform system.

A further object of the present invention is to provide a device designed to work in conjunction with a VR system where the user can navigate through different environments, while staying in one place, and view the changes in the environment commensurate with the amount of movement performed on the invention.

A still further object is to provide a system that does not require a VR system to operate, and in such a mode would allow locomotive functions (similar to treadmills) where one can endure locomotive exercise, yet remain in a relatively stationary position.

Another object is to provide an electromagnetically activated plate/platform/surface which will move or translate objects by modifying the power to the electromagnets within the plate.

Still another object is to provide a system that has the ability to apply resistive forces to the user's body or parts of his body to hold his body or part of his body in one place, thus allowing the system to apply resistive forces to locomotive limbs and extract work from the user.

Still other objects and advantages of the present invention will become readily apparent to those skilled in this art from the detailed description, wherein only the preferred embodiment of the present invention is shown and described, simply by way of illustration of the best mode contemplated of carrying out the present invention. As will be realized, the present invention is capable of other and different embodiments, and its several details are capable of modifications in various obvious respects, all without departing from the present invention. Accordingly, the drawings and descriptions are to be regarded as illustrative in nature, and not as restrictive.

These and other objects are achieved by an electrically operated device which links the locomotion functions of a human with a computer system, which in turn feeds translation motion back to the ELP and supplies data for graphic presentation to various display devices. The soldier navigates on the ELP, using any locomotion characteristic (walking, running, jogging, crawling, etc.) and essentially remains in one place, much like people do when they walk on a treadmill. As the person navigates on the ELP, sensors register his movements and feed this data back to a computer which displays changes in the virtual scenery appropriate to the amount of movement and direction the human has "moved" (in a stationary position). This change in scenery is presented to the human via any number of means such as a Helmet Mounted Display, rear projection screens, multiple monitor screens, etc. This visual stimulus is timed in conjunction with the natural locomotion the human is performing on the ELP and produces what is referred to as (visual) "immersion" into a VE. "Immersion" means the human is fooled into thinking he is moving, operating, and existing in a 3D environment just like in the real world—however, this environment is artificial and is a "synthetically" created realistic 2D or 3D version of the real world. This phenomenon is called "Virtual Reality," making someone feel as if they are really in another place, when actually they have not moved at all.

Immersing the human using visual stimulus is very effective, and when you couple it with physical immersion, the VE becomes even more realistic and believable. Physical immersion is currently achieved for vehicular applications by mounting an operator's cockpit/vehicle on a platform which has six degrees freedom of movement capability. This allows a complete and full range of motions to be imparted into the cockpit and thus to the pilot. They can feel "G" forces, acceleration, banking, braking, turning, etc., all the motions a tank, plane, helicopter, can possibly do; needless to say the effect is very believable and convincing. The present invention can also take advantage of this same proven technology. The present invention is designed to also incorporate the physical immersion effects to the human by applying resistive forces to the limbs and body of the soldier as they are navigating on the ELP. This gives the soldier a feeling of really physically taxing his body, much like he would if in the real world. Resistance can be applied so the soldier thinks he is walking up a sand dune, lifting his body in a vertical climb (even though he may be on a horizontal plane), or any number of similar physical activities which demand effort and energy extraction from humans. The physical immersion is a very important and unique feature of the present invention, as no other mobility platform can provide the same effects to the human body.

DETAILED DESCRIPTION OF THE INVENTION

Figure 1:
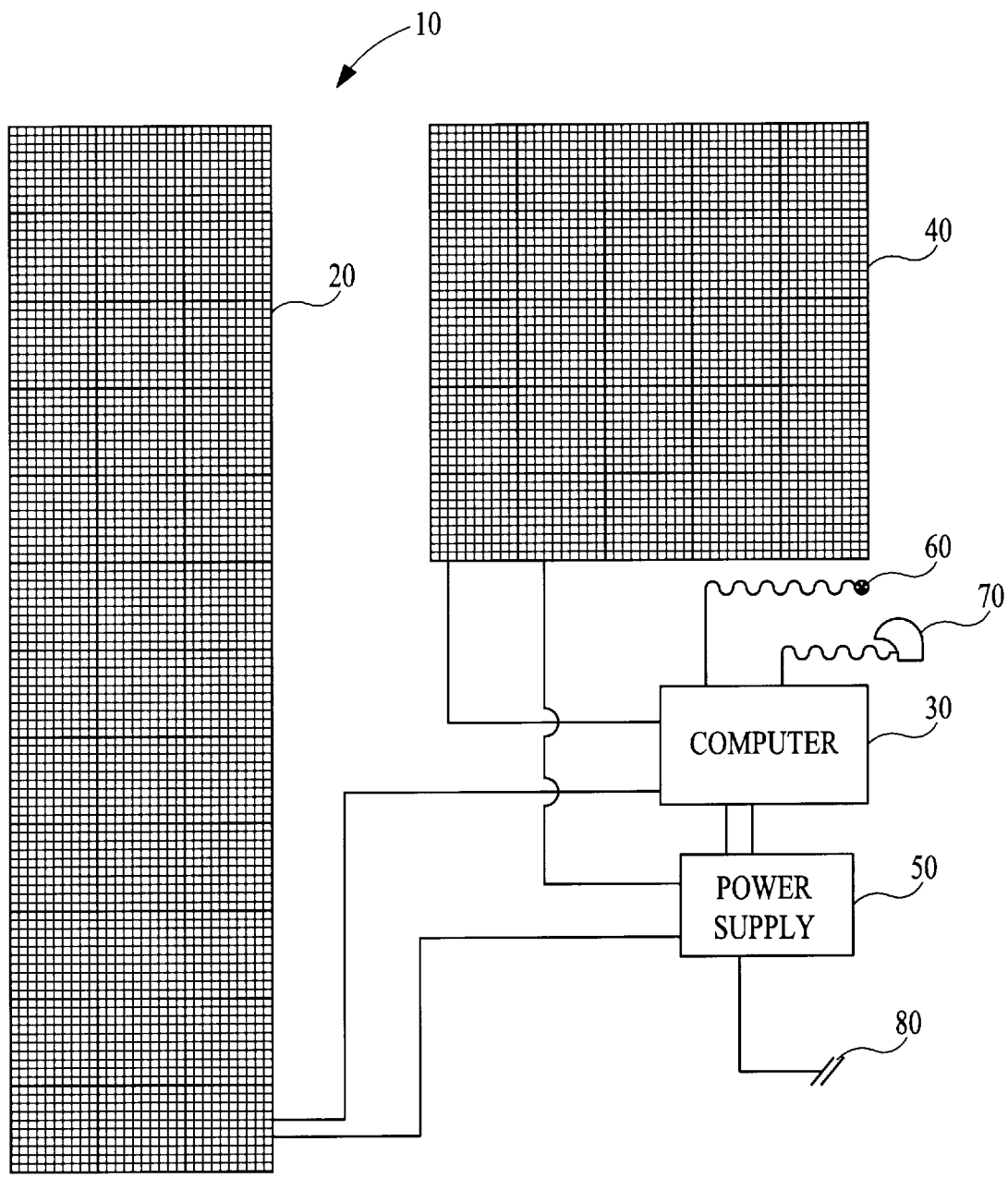
FIG. 1 is a schematic diagram of the present invention.

In the prior art, treadmill devices have been used to allow individuals to walk, jog, and run "in place," and currently are being investigated for adaptation into the VR world. However, there are many limits and shortcomings of conventional treadmill design, some of which are; they basically only operate on one axis, in a forward or rearward motion (usually only forward) and require the user to grasp onto a stationary device or be physically restrained in some manner so they can remain on the device while they are operating it. Without this stationary anchor and reference point, it is very difficult to remain on the device while it is running and definitely impossible to stay on if you do not have use of your vision. In addition to these limitations, the treadmill is not representative of true human mobility, since it operates only along one axis, while humans are capable of a full 360 degree mobility on the horizontal plane, and limited mobility on the vertical plane as well. In addition, the treadmill offers no means for a soldier to simulate locomotion on any plane other than the horizontal and slightly angled surfaces of the earth, and is limited by gravitational pull.

Some advanced concepts of omni-directional treadmills are being developed which allow for a two axis mode of locomotion with a series of belts and rollers operating at normal angles to each other. One fault of this omnidirectional tread mill is the individual belts or tracks would have to move at exactly the same speeds or the junction of the two would become a shear plane and would disrupt any object placed on the junction between the two belts. These treadmill based concepts appear to be very hardware dependent, bulky, noisy, mechanical nightmares, and generally stretching the envelope of what can be done with traditional and currently available treadmill technologies. In addition they are encumbered by the inherent lag times and momentum problems associated with moving mechanical masses; i.e. belts, motors, wheels, tracks, chains, gears, sprockets, and numerous other mechanical components and devices. All of these mechanical masses make instantaneous direction changes nearly impossible because of their inherent momentum, this causes incongruencies and movements which are "unreal" and "unnatural" to the user; and thus, the seamless immersion effect is degraded or even nullified.

The present invention is designed to solve these deficiencies and add additional capabilities as well. As described below and shown in the figures, the ELP is a structural honeycombed subplate comprising a top plate material having a very low coefficient of friction on its surface, which could be any number of plastics, composites, micro ball bearings, or possibly even an air cushion table (similar to an air hockey table) with electromagnets (EMs) placed underneath it and mounted flush to or near the top surface of the subplate. These EMs are individually controllable in both an on and off status, polarity, etc., as well as the intensity of their magnetic force. The EMs are in very close proximity to each other or can even abut each other. They are laid out in a grid or honeycomb pattern in the subplate under the entire "slip" surface of the ELP. The EMs are closely adjoined with no adverse effects on their performance or capabilities regarding overlapping magnetic fields. In fact, the overlapping magnetic fields prove to be a beneficial feature in attaining smooth and imperceptible translations.

Either the EMs themselves or additional sensors are included with the EMs to allow the computer to sense what the individual is going to do. As the foot, object, or extremity nears the proximity of the sensor, it tells the computer to activate the EMs and apply the current for the desired forces and translations. All of the EMs are linked to a computer system as well as a power source providing activation signals and power to energize and de-energize the EMs. The soldier wears a modified standard military boot with a special sole containing thin flexible metal sheets, bars, or a special ferrous particle impregnated sole which is invisible to the wearer. It thereby allows complete natural movement of a normal boot, yet also serves as the attraction device for the EMs embedded in the ELP. It is also possible to incorporate an active system (permanent magnet or EM for example) in or on the surface of the object being drawn to the ELP's EMs to enhance the attractive force over that of a passive (metal plate, ferrous material, etc.) system, or vice versa, with the added capabilities of having repelling or repulsive forces.

The EMs are controlled by a computer so one's pattern of footsteps, gait, and any other individual idiosyncrasies can be gauged, calibrated, and then be input into a file for each individual. This permits an exact replication template of the operators "footprint", "walkprint", "gaitprint", "jogprint", "runprint", "crawlprint", "jumpprint", etc. and allows a very natural and normal transition onto the ELP. The platform can also mimic jogging, running, and jumping scenarios by simply calibrating the gaits and speeds at which the soldier does these tasks. Since the calibration of running may not be feasible on the ELP because of it's smaller size, a companion strip of sensors would be utilized for this calibration phase called the Calibration Strip (CS). The CS is a long thin strip of material which contains closely abutting sensors beneath the entire surface of the strip. These sensors are based on almost any technology, whether it be optical, pressure sensitive, magnetic, pneumatic, microelectromechanical systems (MEMS) etc., as long as they can switch when the foot hits them. This strip allows the soldier to jog, run, walk, jump, crawl, and do all of the functions he intends to do later on the ELP, however it provides him the physical room in which to do the activity at his normal pace and speed so accurate and realistic data is obtained for each speed and kind of locomotion. All relevant points which contact the CS are recorded and sequenced in the order in which they occur, so as to map out all the body contact points and motions of every particular locomotion entity, from crawling on your stomach to sprinting at your top speed. From this recorded and complied database of "locomotion prints", the ELP can then be programmed for the characteristics which will replicate the same exact movements the soldier will be doing while on the ELP. Since there may be slight variations in the actual locomotive functions, the ELP has a built in compensation feature which adjusts and compensates for deviations outside the calibrated data, a locomotive tolerance band. The ease of calibration allows each soldier his own locomotion print so he does not have to conform to a generalized set of parameters based on generic data, and his natural body motions are replicated exactly as he performs them. They are perfectly matched to each individuals body and mimics their own personal style of body movement. This enhances the ability of the device to become transparent, invisible, and to disappear from the soldiers cognizant world of being on a "mobility platform".

Once the soldier's locomotive steps have been calibrated and input into the computer by the CS, he steps onto the ELP and establishes a starting point at the center of the slip plate which now becomes the "Slip Center" (meaning the center position about which the operator will be based or his "home position"). This starting home position can be anywhere on the plate as long as the computer defines the coordinates. This is established by locking in the coordinates of his feet when placed on the surface of the slip plate.

Since the computer has all of the "locomotion prints" on file, the soldier can replicate any one of his stored movements and the computer will know how to mimic his actions. For example, the following is a brief look at the sequence of events which outline one complete step on the ELP. As the soldier begins to walk, his first step makes contact with the ELP and it energizes the EMs beneath his feet and concomitantly activates sensors (pressure, optical, positional, etc.) indicating the body is moving and changing it's center of gravity (CG). These data are sent to the computer, which immediately begins to activate the EMs on the computed track back to his home position. As the EMs directly beneath his foot release, the ones behind it activate, thus pulling the foot rearward towards the home position, in a continuous and fluid (natural-like) sliding motion. Concomitantly, while this foot is being drawn rearward towards the home position and the body begins to regain center over the first foot, the other foot is lifted for the second step. When the first step is completed, the foot is at the home position and the second foot has just completed it's step. Continuing in this fashion, the soldier can walk "forever to nowhere", since he has stayed in the proximity of the center of the slip plate at all times. The soldier's movements and locomotion data drive the computer which in turn updates the VR environment (as seen through the visual interface by the soldier) and causes this displayed environment to change as the soldier walks through it in real time.

The EMs are an excellent means to gradually and smoothly start to move the foot in a rearward motion so as to be almost imperceptible to the operator. Treadmill drive belts transfer motion along each belt or series of belts in one or two directions only, when the belts are trying to move one foot in a specified vector and the other foot touches these belts, that foot is now also moving in the same direction. With the ELP, each foot or body point is individually controllable, so you could have both feet side by side and move one independently from the other in any direction, a unique and valuable feature.

To achieve seamless immersion in VR, the environments must be "real" and "believable" to the user, and operate in "real time" (no latency or lag periods) across all of the interfaces in the system. The human body and mind are very sensitive to visual and motion incongruities and when these faults are perceived they destroy the mind's and body's ability to believe the immersion is virtually "real". In fact latency and lag time (defined as the time it takes to update the frame rate to what is "real time" in a visual sense and the difference of time between action and reaction of physical objects=haptic lag) are the most critical human elements in VR simulations and cause operators to become ill when exposed to these problems, this is commonly referred to as "motion sickness" or "simulator sickness". The human body is designed to perceive changes in movement on land in relation to the center of the earth, and when anyone of the three human sensory systems (the visual system, the vestibular system, and the proprioceptive system) receive erroneous orientation information, it may propagate sensory illusions which cause spatial disorientation and eventually leads to "motion sickness" of the human.

The ability to change directions on the ELP is facilitated by having sensors (directional, positional, area, etc.) in the boots of the soldier which indicate the orientation of the boot as it is placed on the ELP. If the boot changes direction and orientation from its last position and orientation, the computer then activates the EMs in the general direction of the perceived next step. This puts all the possible EMs "on call" waiting for the signal from the boot to activate and attain proper power levels (attractive forces) for the activity being performed. This allows the soldier the ability to run on the ELP and then change directions quickly, as if running on land. Because of the instantaneous speed of the signals and activation of the EMs, no latency will be noticed by the user. This ability allows the soldier to run and change directions or even allows him to walk backwards or sideways. Also, the soldier can run and stop on a dime without being thrown off by a continuously moving treadmill belt hindered by momentum and braking forces which are not instantaneously altered. The EMs are activated only when needed, and there is no constant motion device like a drive belt imparting energy to the user and no moving parts having momentum forces which would require some lag time to stop, change directions, accelerate, decelerate, etc.

If programmed into the ELP, the soldier would even be able to side step, as if walking on a ledge of a building with a perceived VR 400' drop to the pavement. As the user comes to a stop, the VR environment and feet will simultaneously be brought back to their home position with the soldier being unaware of this movement. This places him in his original starting position from where he can continue his operations. It may not be necessary to return home if the computer can adjust the home position and there are no other conflicts with the ELP or other operators. In a sense, the user is led in a small never ending circle; this is an option if the user perceives the rearward pull back to home position. Nevertheless, this still allows the soldier to operate in a very small confined area, as opposed to the massive amounts of ground covered when performing his normal activities in the real world.

A unique feature of the EMs is their attraction force can be varied by the amount of current being supplied to them. Using this phenomenon allows the resistance between the boot and the ELP to be changed to replicate different surface conditions, based on different coefficients of friction. For example, a snow and ice covered surface has a very low coefficient of friction (and subsequently a very low attraction force supplied by the EMs) and conversely, a hot black top road has a much greater coefficient of friction (and thus a higher attraction force supplied by the EMs). This feature allows the soldier to actually slip and fall, if he doesn't place his foot properly on the "ice covered" slip plate state, yet gives him extremely good traction when on the high coefficient of friction surface state of the hot black top road.

The ELP also permits additional features unavailable to treadmill designs such as the following:

The ELP can simulate an "out-of-bounds" area on obstacles which the user may be negotiating; i.e., if the infantryman is walking along the top of a log balance in the simulated VR environment there may be only a small portion at the top circumference of the log which will permit a footstep capable of negotiating the log. If the subject steps too far to either side he may lose his footing or may fall off entirely. In the case of the ELP, this designated "non-walk" or "out-of-bounds" area could result in the foot being locked to the ELP, or the foot could be pulled to the side indicating or replicating a mis-step or slip on the log balance. Similarly, negotiating a tire obstacle run would be accomplished by predetermining the free travel zones for the foot and the interference zones where the foot would get stuck in the tire. This ability to determine customized zones of "travel" and "no-travel" will add to the realism in the VR world, by enhancing user feedback while negotiating certain obstacles. It will also allow for accurate performance data to be gathered in test and evaluation efforts utilizing man/equipment/environment scenarios.

The EMs are arranged in a grid pattern in very close proximity to each other; this results in a continuous magnetic field which is controlled in any X-Y direction on each ELP regardless of the ELPs orientation. Activation of the EMs is programmed to gradually increase the field of strength and also to gradually translate their attraction fields from one to the next in a wave-like motion; this range of adjustments allows the foot to be moved in a very smooth manner, almost imperceptible to the soldier. Since the holding power of electromagnets decrease in proportion to a reduction in energy supplied (they will loose approximately 75% of their original holding force before it drops to 0 holding force), and attain maximum holding power in the same manner, this allows for a very smooth translation of the attracted objects by a magnetic wave. With timing, attraction intensity correctly adjusted, and control of the EMs synchronized, the soldier is able to walk in one place and feels as if he is traversing the terrain because of being immersed in the VE.

Another benefit of the ELP is that each foot is individually controllable, so if a soldier has his feet placed in different mediums, i.e. sand and rocks, the different movement and slippage perceived by humans is replicated by the ELP. One foot could be on either firm or loose rocks and the other foot might be slipping and sliding on a sand covered base. Gradual slippage and movement is thus incorporated to mimic even the smallest of movements and in any direction. This adds to the realism, believability, and seamlessness of the entire immersion effect.

In all modes of using the ELP, a safety harness or other safety system should be employed to maintain a fall back means of catching the soldier/user either while climbing the vertical, negotiating the horizontal, or using any of the ancillary devices on the ELP to insure their safety. If the system did have a malfunction (i.e. power loss) the individual would then be caught by the safety harness. If the system had a computer malfunction, the operator and user would both have "master kill" switches to shut off all power to the EMs instantaneously rendering them useless.

Another method of ensuring the infantryman's safety is, to have a perimeter of sensing devices around the ELP which monitors the user's position and feeds this back to the computer system. This would watch for any sudden movements or be used as a signaling source to cue the computer of the user's intentions, a second means to anticipate or check the user's movements and direction of travel.

Construction of the ELP is modular so the entire plate can be disassembled into smaller subplates and easily transported (minus the six degree-of-freedom device). The ability to join the panels together and lock them in place, permits the ability to construct the entire slip plate almost anywhere. In addition to being of modular construction, the panels are very durable and lightweight, and with a series of imbedded circuits, conventional wiring is eliminated or reduced significantly. Each EM is individually locked into its receptacle by a simple twist lock coupling, which also completes it's connection into the embedded circuitry back to the main computer. This allows for easy replacement of each individual EM in case of failure. If one EM fails, the computer compensates by increasing the pull of it's adjoining EMs, so the function currently in process is not degraded. This also allows the computer to have a self diagnostic capability to insure proper operation of all the components, and makes replacement easy and efficient. Since the individual panels are small and easily transported the entire system is man-portable.

The power requirements for operation of the ELP are minimal, since there is a need only to energize the areas directly under the feet for the operation the soldier is currently doing and preactivating the EMs in the next anticipated movement area. Thus, only small areas and numbers of EM's are being energized at any one particular time.

One problem in simulating VR worlds is climbing steps; i.e., how do you realistically simulate a man walking up and down stairs while in one place? With the present invention, this is accomplished by having two or more "Live" panel segments. These "Live" segments are capable of rising vertically above the horizontal plane of the ELP to mimic steps (standard step dimensions are about 7" rise and 12" tread depth) or any other vertical surface required. These steps rise and fall as the soldier steps on them, much like a stair stepper device. Steps are manipulated by various mechanical means which provide quick response time and also permit a fill range of activation speeds so the soldier can climb or descend at any rate desired. Another means to simulate steps is to have a designated area of the ELP have an imbedded system of revolving steps similar to a revolving tank tread, treadmill, escalator, or squirrel cage device. This allows the soldier to step vertically as well as horizontally as is done in normal stair stepping. The soldier actually walks to the steps on the ELP, utilizes them, and then is routed and translated back to his home position until the stair device is needed again.

The ability of the ELP to have different specialized function areas is a critical design capability, as it allows the soldier to access many different physical apparatus required to simulate all of the functions and obstacles encountered by a soldier in a real and simulated environment.

Simulation of prone crawling is also accomplished with this device by calibrating in the soldier's motions on the CS. It is also possible to simulate this type of crawling by anchoring the subjects stomach or midsection to the center of the ELP (by means of a metal disk or attractive device located on the soldiers body, probably near the center of the stomach) and then simply let the soldier move his arms and legs in the crawling fashion with the appropriate amount of drag being provided by the EMs at the required body points. In this case, the soldier wears BDUs which have metal disks or attractive devices located at the various body points (elbows, knees, etc.) which make contact with the ELP (the same locations as defined by the CS). However, it may be more realistic to actually allow the soldier to move his entire body forward in one motion and then pull him back by moving all contacted points simultaneously, or "steer" him in a circle as he crawls. If the BDUs incorporate active attractive devices (EM's, permanent magnets, etc.) instead of the passive attractive devices, then it is possible to induce both the push and pull motions for energy extraction and translation purposes. Since the versatility of the present invention is so adaptable to different situations and procedures, it will prove to be a very valuable test bed and tool in determining the requirements of how best to simulate in VR what actually happens in the "Real World".

Another possibility for the present invention is to mimic vertical or near vertical climbing; since the EMs can be of sufficient power to actually hold a body against the ELP, it will work in other elevations as well. EMs generally are 75% less efficient in shear force but this is overcome by the fact the user is not moving as quickly and they would most likely have three points (possibly more) of contact on the ELP at any one time. Plus, the EM's could be located only at points where body contact would be appropriate, i.e., handholds, ladder rungs, outcroppings, etc., and thus would be able to be larger and with more powerfill attractive forces. Given adequate EM strength, the soldier or climber is able to hang from only one point of contact without slipping or breaking the magnetic force holding him against the ELP. This allows the soldier to scale any "virtual" vertical object i.e.; walls, rope ladders, and mountainous rock formations.

When the soldier is climbing a vertical surface, he has to hold a gripping device, glove mechanism, or attraction means, so the ELP can act upon it. In the case of climbing a rope ladder for example, the gripping device (gripper) has a portion of rope which the soldier would grasp; for mountain climbing the gripper mimics a rock hand-hold; and in the case of a metal rung ladder, a metal bar is the gripper device. These devices are located on the vertical ELPs and are accessed by the operator seeing the hand hold grippers through the VR helmet. The gripping devices may require a special designation or enhancement for the soldier to actually locate and grasp them, but once in hand, they become the means to travel up and down whatever the obstacle appears to be. On a rope ladder for example, the only EMs which activate would be the ones located visually within his grasping range, so if he put his hand in a space, and not on a rope, he feels no rope resistance; the same is true for ladders, i.e., only where a rope or rung appears to be. The soldier is able to lift the climbing device by activating a switch mechanism which tells the computer to de-energize that group of EMs. The switch mechanism could be as simple as a button, grip switch, or even as transparent as a switch which operates, when for example, the soldier takes pressure off of the rope device, signaling a potential move by the soldier and thus signaling for de-energization of the EMs to permit free use of the hand gripper for its next move.

In a vertical climbing mode the feet also require a means to place them into and out of the VR ropes. These could be similar to the devices used for the hands yet modified to attach onto the boot's toe and/or sole. They still get the feel of a rope foot hold by designing the release button to activate as the pressure is lifted from the rope. In this case the toe slides in a grooved receiver gripper which allows the boot to ride up and down in a gimbaled device so the foot can get the "feel" of the rope yet still permit attachment to the ELP.

With a special rope laying device, the soldier will also be able to simulate climbing up and rappelling down vertical surfaces. The rope feeds out gradually as the soldier begins climbing and his feet are able to grip the walls. As he moves, his feet are brought back to home position, just as the procedure employed when walking on the horizontal ELP. The technology also permits overhead traversing with strong enough EMs, so it is possible for the soldier to actually maneuver in a 360 degree environment; in fact, with grippers on both feet and hands, the soldier is able to move like an insect on any wall; vertical, horizontal, or even upside down!

The addition of a "tilting" device (means for lifting one or more edges of the ELP) allows the ELP to simulate traversing of hills, slopes, inclines, and depressions, as the entire ELP is positioned at any simple or compound angle. This technology is already utilized in vehicle simulators which have six degree-of-freedom (DOF) motion platforms. This feature places extending and retracting means (E&RM) (like hydraulic cylinders) underneath the platform, and by increasing or decreasing the length of each individual E&RM the angular position of the platform can be oriented in virtually any x, y, & z configuration. This same technology is applied to the ELP for dynamic positioning capabilities of the terrain the human is navigating over. In vehicle simulators it can induce "G" forces, accelerations, braking, tilting, banking, climbing, descending, etc., any number of actions a vehicle would endure in it's mission, and the ELP also benefits from having the same capabilities using a "live" 6 DOF mobility platform where the need requires it.

The addition of a companion vertical wall (which can be adjusted to any angle as well), imparts the added feature of deriving compound angled obstacles for the soldier to negotiate. This capability is very useful in simulating or replicating overhangs and building outcroppings in tactical situations.

To simulate resistance of walls against the shoulders and body of soldiers in tactical situations inside or outside of buildings, the ELP system has a series of vertical walls which could act against metal plates or attractive devices located in various areas around the body. This provides a good tactical feel for snaking against a wall and works for any position on the body. For example, the soldier could crawl on his belly or could crawl on his back; with the present invention he is limited only by his imagination, since the ELP will act upon any body or material which is attracted to the magnetic field. As long as the movements can be calibrated from the CS, then the actions will be able to be replicated on the surfaces of the ELP. The ELP may be able to attract points on the body other than those calibrated on the CS for translating. This would be done to simply impart resistance to the user for physical immersion effects (dynamic resistance) and would not necessarily be used to locomote or translate the soldier, only to apply resistance to his movements.

In addition to providing a very realistic training device for the military, there are a vast array of other uses for the ELP in the commercial world. Since one can program in specific predetermined movement paths, the system can be used to rehabilitate people requiring locomotion rehabilitation. One can make their feet, arms, limbs, hands, fingers, etc., move ti preprogrammed steps to help in the rehabilitation process. This will benefit people who cannot move their limbs on their own, e.g., because of muscular atrophy, injury, deformation, etc. The ELP can move these body parts for them. The present invention can assist in the rebuilding and regenerative process by working the limbs and muscles which are in need of exercise. The ELP can be used as a means of correcting dysuenctional foot or orthopedic abnormalities and can be incrementally adjusted as the progress of rehabilitation develops. The ELP can provide gradual increases in angles and motions critical to the proper development or rehabilitation of the various limbs and will apply just the right amount of incremental correction so as to minimize any undue pain or suffering on the subject. The ELP is so adaptable in function and form that it could be configured at such a micro level as to facilitate movement of individual fingers, toes, or other small shapes. Its versatility in configuration variability makes it easily adaptable to many various different fields and sciences with many current and unforeseen uses yet to be discovered.

The ELP will have many applications in the entertainment industry, especially for VR games, movies, animation, special effects, and featured interactive scenarios. Industry can use this technology in many applications, such as a sorting device, transfer systems, clean room applications, and many other uses. The ELP can be used as a means of moving ferrous metal chips away from manufacturing machines such as mills, lathes, grinders, etc. The ELP will attract the metal chips and then translate them into hoppers or recycling bins for reclamation. Use of the ELP can replace or assist the "wet" method of flooding the area with coolant to flush chips away from the cutting area; it will work very well in applications where the "wet" method would be prohibited, or moving belts would be inappropriate. The ELP can be configured in any shape or contour which would partially enclose or encapsulate metal removing machines and can attract ferrous particles of very small almost invisible proportions; such as are emitted by grinding operations, lapping machines, or any other process which produces fine dust like particles which may become airborne and cause problems in adjacent equipment, clean areas, electronic components, etc., or become trapped in human lung tissue.

The ELP can also work as an anchoring device for Astronauts in space stations where loss of gravity is a problem; it will allow them the ability to move around wherever the ELP was located by attracting their feet, hands, body, etc. to the ELP. It will also help in situations of weightlessness concerning machining operations; it will attract all of the ferrous metal chips, particles, and dust which would otherwise become airborne contaminates and be used as a containment device to trap these floating debris. This will be a very critical problem in space because these small particles could cause serious foreign object damage (FOD) by infiltrating all kinds of electronic and mechanical equipment.

Another commercial use will be to detect, and then attract, ferrous objects (guns, weapons, knives, etc.) in areas of increased security. If a person was attempting to enter a building with a weapon, the magnetic force field would be disturbed; the field would then be increased to attract the weapon to the side of the wall containing the ELP. If the attraction force was large enough, it would not permit the weapon to function, and could then be used to move the weapon away from the user.

This technology can also be applied to game boards where pieces are required to be manipulated by the computer while playing against the human. This will permit a very thin and compact unit because movement of the game pieces would not be dependent upon mechanical linkages and arms to make x-y positional movements.

The sports world will also find this device an excellent conditioning device and will allow people to participate in sports they normally would never try, such as free climbing the side of a mountain, sky diving, or any number of extreme sports people are hesitant to participate in. People could walk or run against various resistance fields in order to develop particular muscular features difficult to currently exercise using conventional methods, or in dangerous situations such as mountain climbing.

Since the basic system is entirely static with no moving parts, it will lend itself very nicely to multiple players or users; on one large ELP, it will be possible to have multiple players using the same ELP and interacting with one another. Since the directions are all computer controlled, one could have soldiers facing each other, side by side, or in any other manner since they only activate EMs in their area. The system is so versatile one could conceivably program in a pattern to actually spin a person around and around in circles by having their feet or body follow the preprogrammed paths. If, for example, the ELP was constructed in a spherical shape the soldier could mimic free fall flight maneuvers (like the HALO jumpers do in the wind tunnel) or simply "fly" around the interior of the sphere. With a teleoperated direct digital control link and a sensing system to control the computer, the soldier would be able to determine his own flight path on the ELP at any time. He would simply communicate where he wanted to go and the EMs would take him there.

Referring now to FIG. 1, a schematic diagram of the present invention is shown. The ELP System 10 comprises Calibration Strip (CS) 20, Computer 30, ELP 40, Power Supply 50, Remote Control Device 60, Visual Interface 70, and external Power Source 80.

CS 20 is a device which collects and transmits positional data from itself to Computer 30. It's function is to collect all of the pertinent locomotive data of subjects maneuvering on CS 20 and send this data to Computer 30 for storage and programming the "locomotive prints" of each user navigating on ELP 40.

Figure 5:
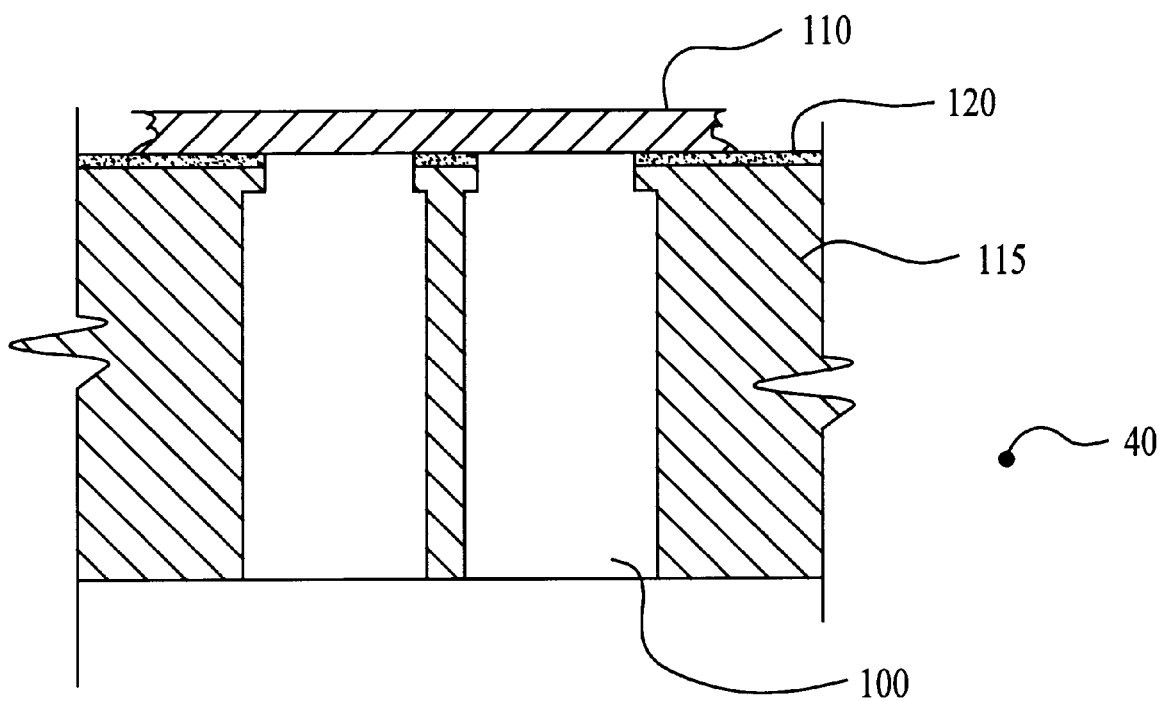
FIG. 5 is a sectional view of the ELP showing the position of the electromagnets, the slip plate, the sub-plate, and the attracted object.

Computer 30 receives all of the data from CS 20 and uses it as information on how to operate the control of the EMs in ELP 40. This includes the timing, location, intensity, polarity, and other pertinent data required to allow the navigation of the human body and objects on ELP 40. Computer 30 controls all activation input to the EMs: to energize and de-energize, intensity levels, self diagnostic data, timing, sequencing, polarity, etc., which performs the movement of the Attracted Objects 110 (see FIG. 5) being positioned, translated, and moved around ELP 40. Attracted Objects 110 can be virtually any passive object which would be attracted by a magnetic field, such as metal plates in clothing, modified boots, metal objects, non-metal objects with enough ferrous content to be attracted, etc. These Attracted Objects 110 can also be active in nature, these items could be EMs, permanent magnets, or any thing which can generate positive or negative magnetic fields.

EMs 100 (see FIG. 5) are electromagnets which produce a magnetic field when their coils and windings are excited by electrical current. EM 100 field intensity is variable in proportion to the electrical power supplied to it. The more electrical power delivered to EM 100 results in more magnetic force (up to a designed level) and vice versa; the less power supplied the weaker the magnetic force.

Computer 30 also receives data from the Ancillary Sensors 90 located on ELP System 10; Remote Control Device 60, and Visual Interface 70. This data then is used to change the scenery downloaded to Visual Interface 70 for the visual immersion of the infantryman, and for navigation purposes.

Remote Control Device 60 is a unit which allows the user of ELP System 10 to issue commands to Computer 30 for additional control while navigating on ELP System 10. Initially this input device may be hardwired, but the ideal solution would be to have the communication link be a wireless transmitting system so as to eliminate any tethers or connections to and from the user. This would then allow the soldier complete freedom to move about, just as in real life.

The Visual Interface 70, in this embodiment an HMD, is a helmet which the user wears while being immersed in the VE; it provides simulated images of terrain, objects, and everything visually associated with the real world. The Visual Interface is not limited to using a HMD however, it could be any number of visual devices or systems capable of displaying or presenting graphical images to the user.

Figure 3:
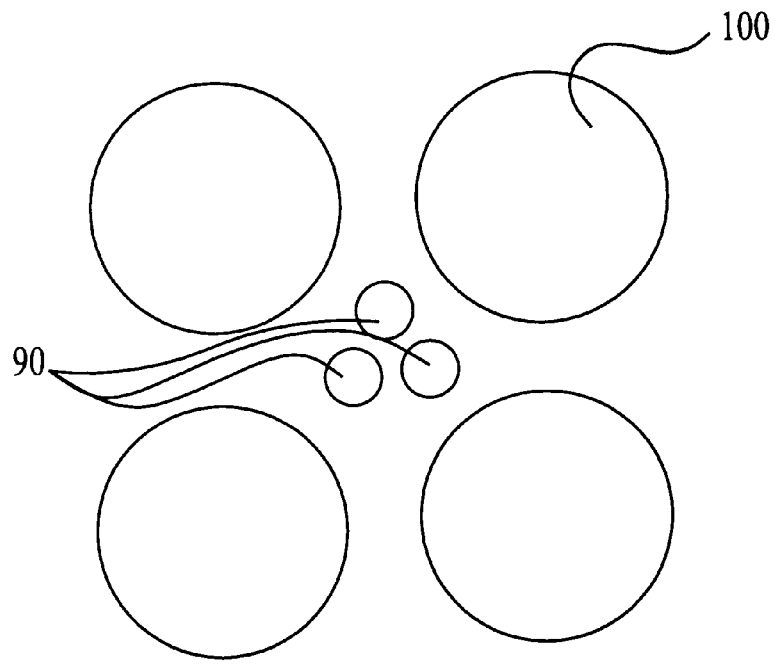
FIG. 3 is a plan view of one embodiment of the electromagnets and ancillary sensors in the ELP.
Figure 4:
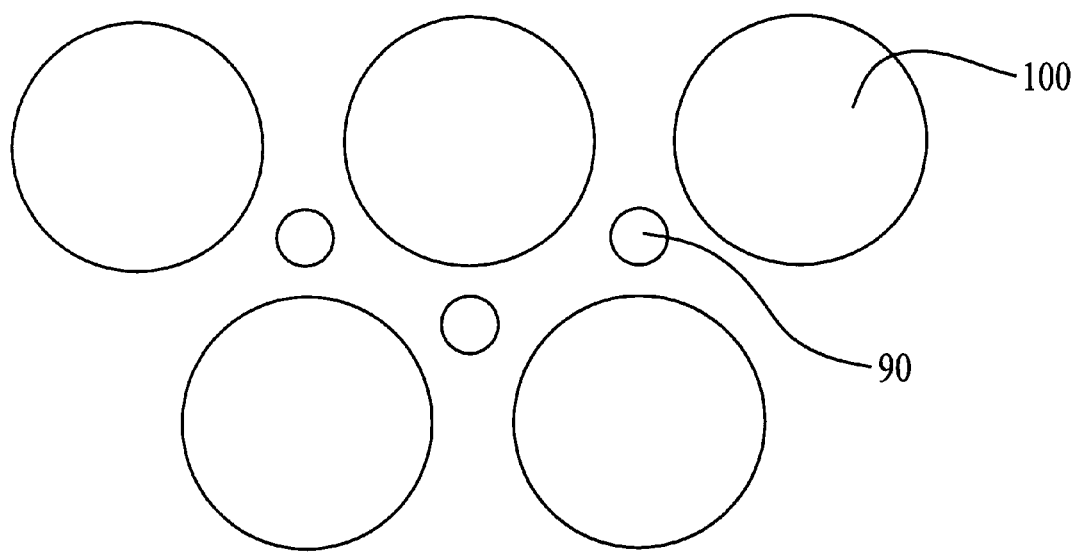
FIG. 4 is a plan view of another embodiment of the electromagnets and ancillary sensors in the ELP.

ELP 40 is a plate-like structure with internal cavities designed to house and accept EMs 100, Ancillary Sensors 90 (see FIG. 3 & 4), and to form a Sub Plate Structure 115 (see FIG. 5) for supporting Slip Plate 120. ELP 40 has integrated circuitry for all of the individual cavities in Subplate 115 and connects the circuitry for EMs 100 and Ancillary Sensors 90 as well. The main purpose of Slip Plate 120 is to provide a very low coefficient of friction surface on which all of the attracted objects will slide or glide; it is almost like a continuous sheet covered with infinitesimally small ball bearings which allow near frictionless movement. The Sub Plate 115 structure is a rigid housing plate which serves as the basic supportive structure and mounting system for EMs 100, all other Ancillary Sensors 90, and other components associated with ELP 40. Ancillary Sensors 90 refer to all sensors embedded in or around ELP 40 and any sensors carried by the individual or object being translated on ELP 40, since they would have a parent/sibling relationship. These sensors accomplish many things, such as notification of near foot contact, directional changes, pressure sensing, and may include solenoids and any other control linking sensors required for the operation of the ELP System 10.

Power Supply 50 is a unit which supplies the correct proportional electrical inputs to EMs 100, depending upon the input signal from Computer 30. This allows EMs 100 to "blink" on and off very rapidly allowing the Attracted Objects 110 to move smoothly on Slip Plate 120.

Figure 2:
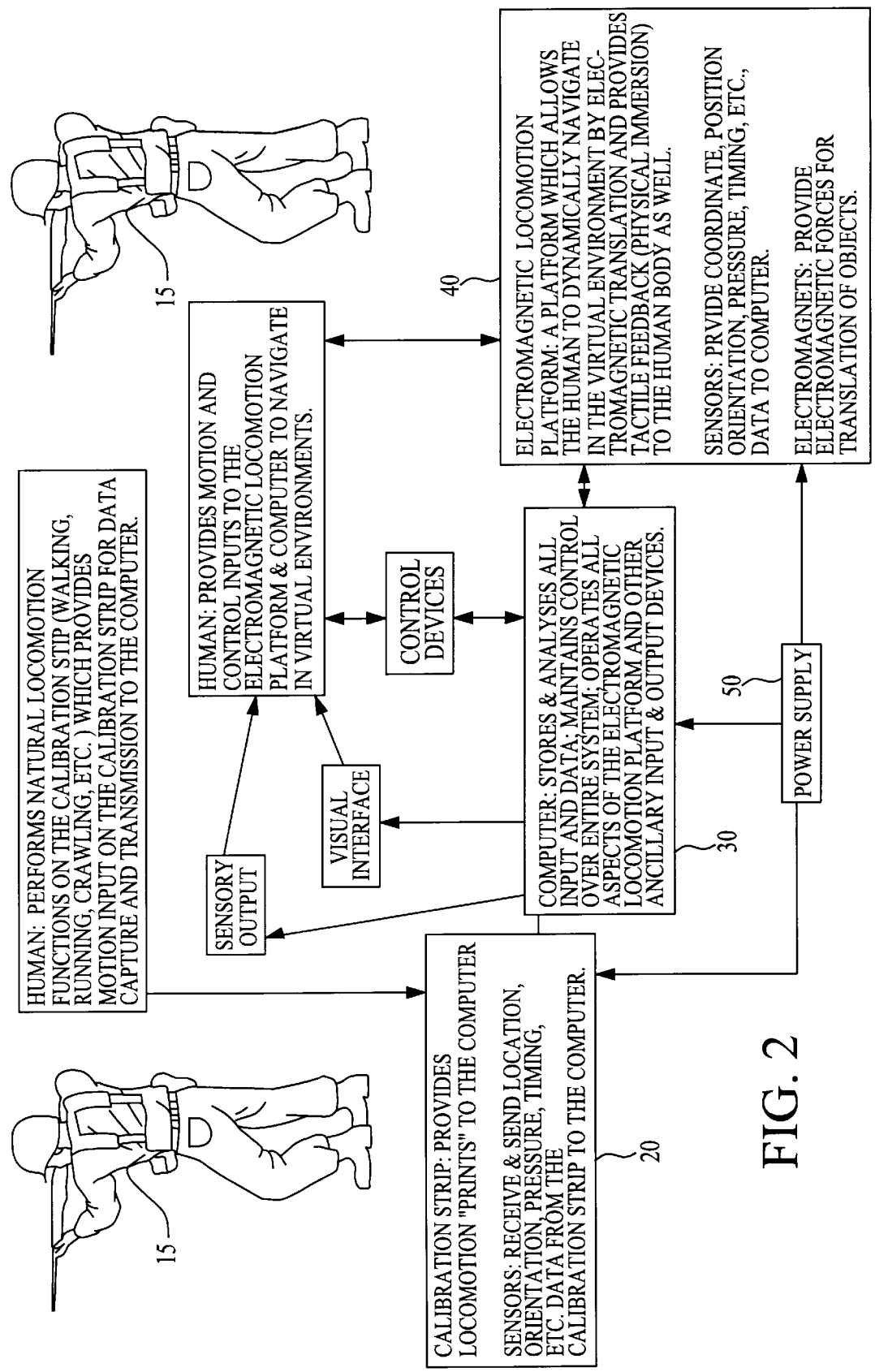
FIG. 2 is a flow chart of the present invention showing the basic components and their interfaces.

The operation of ELP System 10 is performed in the following order:

First, Infantryman 15 (see FIG. 2) performs his array of maneuver functions on CS 20 to record and store all of the moves he will be doing on ELP 40. CS 20 will allow him to perform his physical activities as he normally would at the proper speed, distance, gait, etc. so as to capture all of the locomotion data for use when he is on ELP 40. Once the data has been collected and input into Computer 30, Soldier 15 is now ready to don the specially modified BDUs and boots, get onto ELP 40, and establish a center or home position.

Next Subject 15 will don HMD 70 and any Remote Control Device (RCD) 60 he will require to communicate with Computer 30. RCD 60 may be a hand held unit which signals Computer 30 different functions Subject 15 is performing, or could even be a voice activated wireless control mechanism. A voice actuated telemetry device would be an excellent method for Soldier 15 to communicate with Computer 30 since it would be a hands-off, hands-free method of communicating commands, signals, and instructions to Computer 30. This would eliminate the hindrance caused by hard wires linking and tethering Human 15 to System 10. RCD 60 may include commands such as start, stop, walking speed, running speed, direction, etc. which provides User 15 with his own steering device for navigating on ELP 40. These voice commands would generate a voice recognition system allowing a completely "hands-free" operation of the ELP; this technology is currently being utilized in other "hands-free" VR applications in use today.

Figure 6:
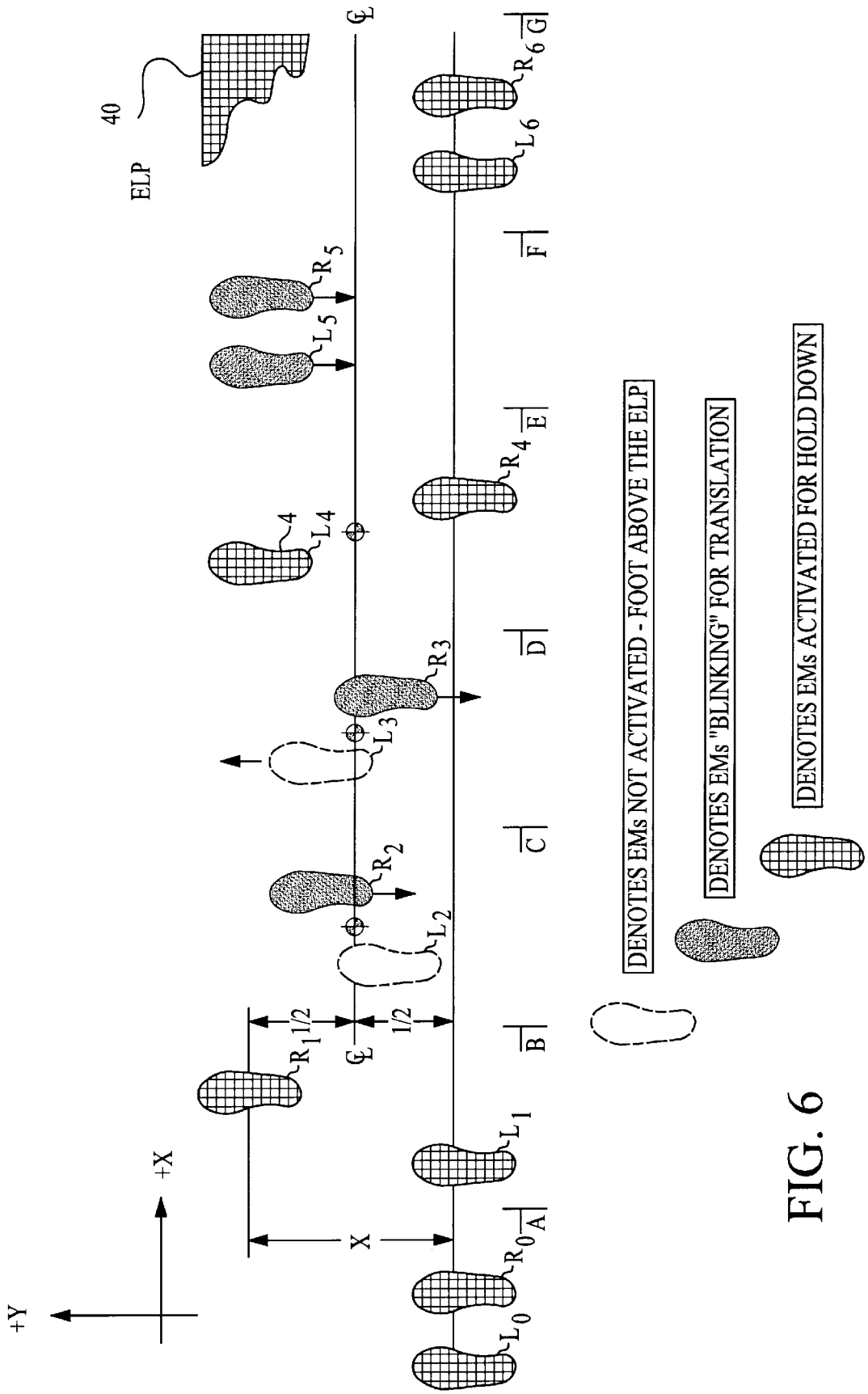
FIG. 6 is a plan view of the individual foot steps, their locations, stepping orders, and translations associated with making a complete "virtual step" on the ELP.
Figure 7:
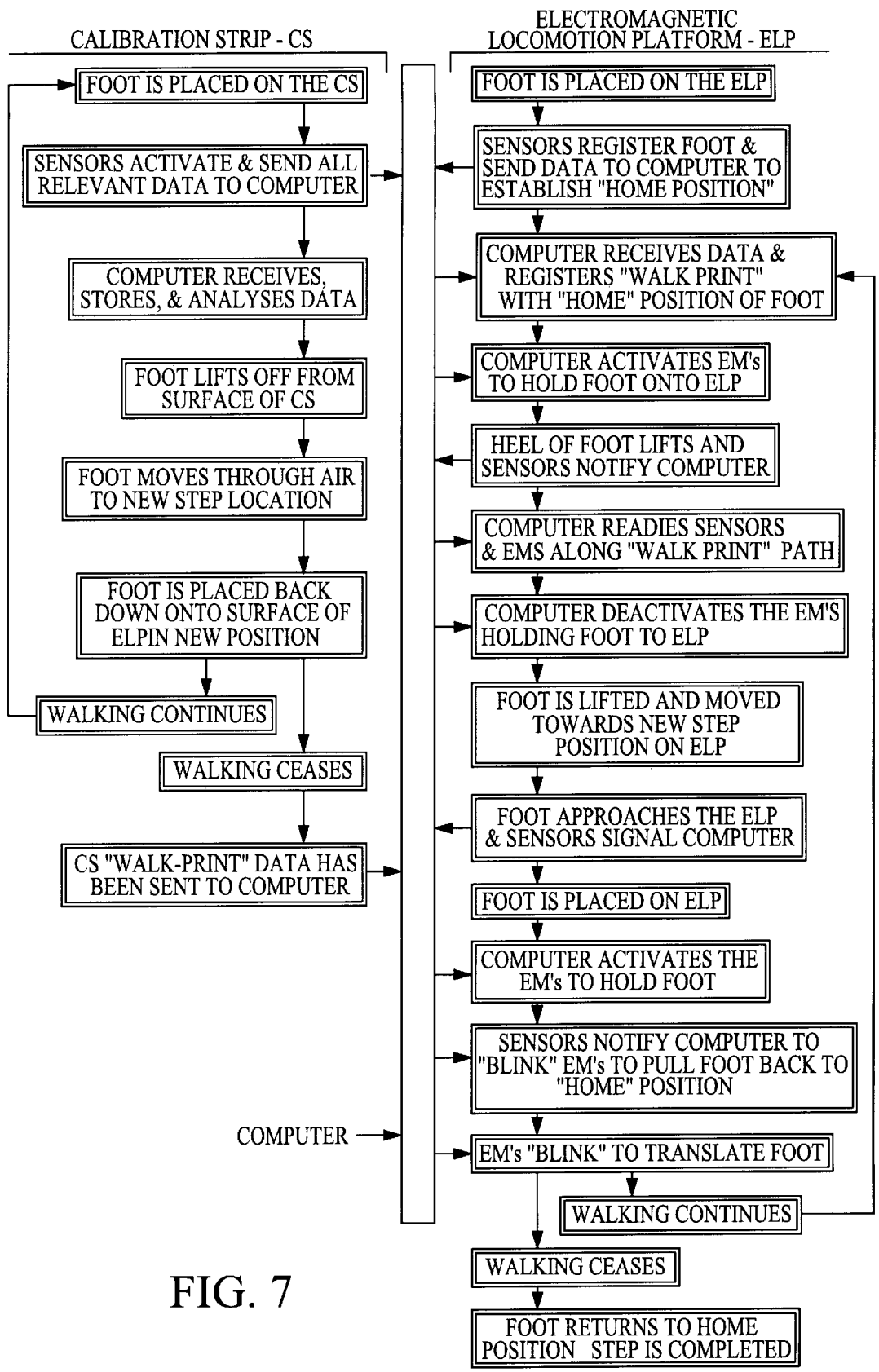
FIG. 7 is a logic diagram for completing a step on the present invention.

The following example of a "Virtual Step" will address only one functional use of ELP System 10; it is, however, representative of the multitude of other scenarios which may be performed on ELP System 10. Refer now to FIG. 6. Soldier 15 will place his feet at the start or home position on ELP 40 and signal Computer 30 (position "A"—$L_0$ & $R_0$) to enter this position into memory. Once the commands have been given by Soldier 15 he may begin to walk on ELP 40. In position "B"—$L_1$ & $R_1$ Soldier 15 has de-energized and lifted his right foot and placed it back onto the surface of Slip Plate 120 of ELP 40 "X" distance from his original stance. Booth feet are now being held by EMs 100 to the surface of Slip Plate 120 of ELP 40. Next, User 15 will deactivate his left foot and move it forward above ELP 40 (as shown by the dashed outline) in position "C"—$L_2$ & $R_2$; concomitantly, as the left foot is moving in the +Y axis direction the right foot is now being translated backwards in the −Y axis direction. The center of gravity (CG) of his body is now moving in the +Y direction as shown by the CG symbol. In position "D"—$L_3$ & $R_3$ his left foot continues to move in the +Y direction and his right foot continues to move in the −Y axis direction. When the step is completed at position "E"—$L_4$ & $R_4$, his left foot is now attracted to ELP 40 and his right foot is also attracted and stationary. The next step is for his right foot to be de-energized and move forward to a parallel position beside his left foot, position "F"—$L_5$ & $R_5$. To complete the entire step the two feet are translated rearward simultaneously back to the home or start position, position "G"—$L_6$ & $R_6$.

User 15 has now completed one entire "Virtual Step"; follow on continuous steps would repeat in a similar fashion (steps $L_1$ & $R_1$ through $L_3$ & $R_3$) and is representative of the type of motion required for the other various locomotive scenarios.

Figure 8:
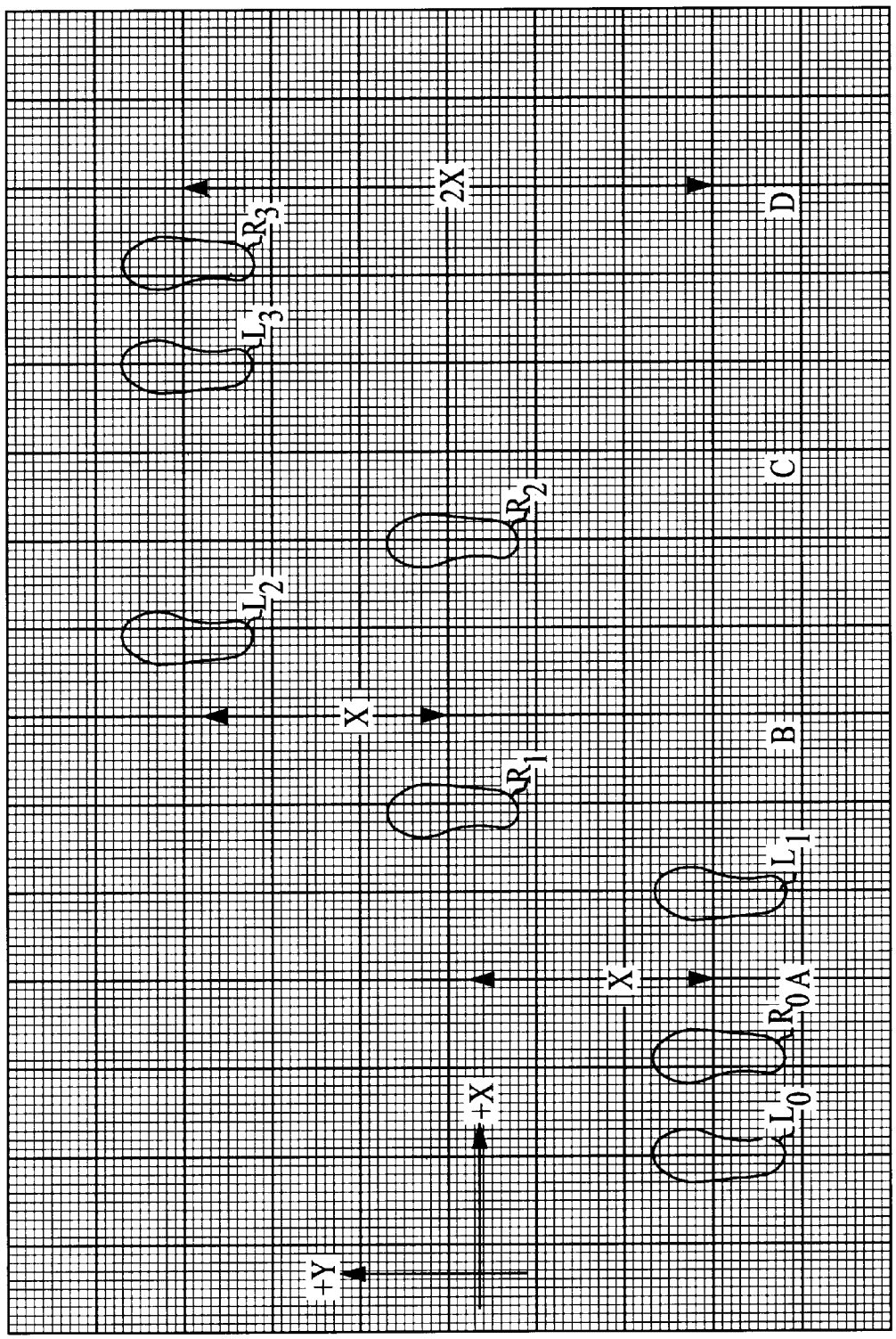
FIG. 8 is a plan view of the individual foot steps, their locations, and stepping order for an "actual step" in the "real world".

As a baseline comparison to an "Actual Step" in the "Real World" refer to FIG. 8. In this sequence the two feet are on the ground at start position "A"—$L_0$ & $R_0$. Soldier 15 begins the step procedure by lifting and placing his right foot on the ground at position "B"—$L_1$ & $R_1$, distance "X". Next his left foot is lifted and placed on the ground at position "C"—$L_2$ & $R_2$, distance "X". Finally to complete the step, his right foot is lifted and placed on the ground at the final position "D"—$L_3$ & $R_3$, total distance=2X.

As shown in FIG. 6, the total amount of ground traversed in the "Virtual Step" is "0" from start to finish ($L_0$ & $R_0$ to $L_6$ & $R_6$ respectively), and in the "Actual Step" (FIG. 8) the total is 2X, or two steps. This capability of traversing "zero ground distance" in "Virtual Stepping" is paramount to the use and adaptation of ELP System 10 into the VR world. It allows Soldier 15 the capability to "walk forever to nowhere", meaning he will be stationary about a center point or parameter, yet the VR system will change his mental picture in accordance to the locomotive input he provides on ELP 40. He can virtually walk any where in his mind and physically remain in a very small perimeter.

Figure 9:
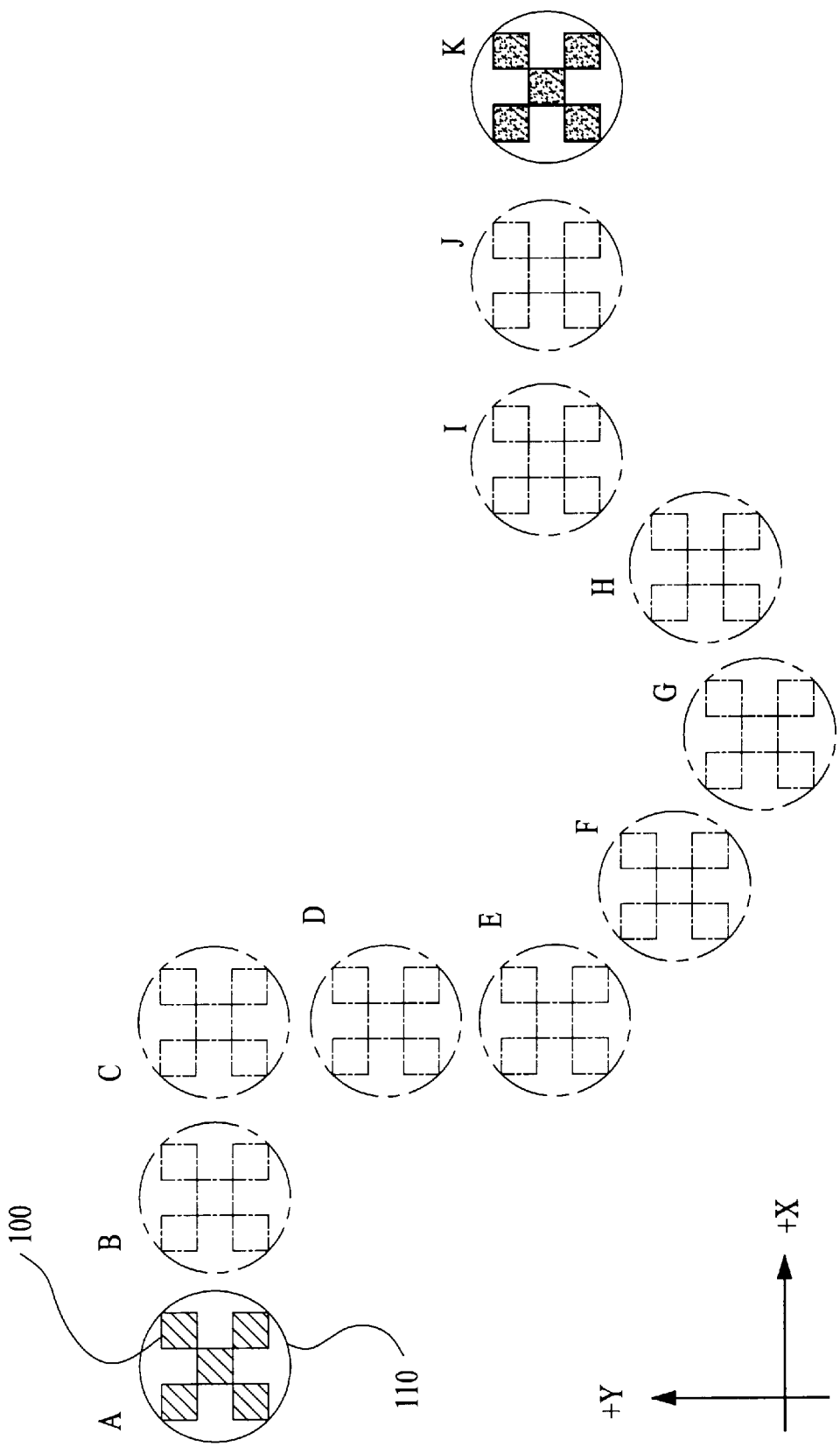
FIG. 9 is a plan view showing the translation of an object by "blinking" of the electromagnets on the ELP.

There are three methods of how ELP 40 will translate objects. The first method is to simply shift the power (and thus attractive force on the EMs) beneath the attracted object in small increments so the object will follow the attractive magnetic field. Refer now to FIG. 9, which shows a simple Attracted Object 1 10 being translated on ELP 40 from a starting position at "A" to a final position at "K". First EMs 100 are activated to hold Object 110 on ELP 40 at the starting position "A", next the magnetic footprint is "blinked" off in position "A" and "blinked" on in a new position "B", thus pulling the Attracted Object 110 to the new location of the magnetic field. This method will require a smart system to know where Object 110 was and where the shift is intended. The magnetic fields can switch almost instantaneously and therefore may allow for an almost imperceptible movement to the user. The quicker and smaller the shift, the less noticeable and more fluid the translation will appear. This "blinking" procedure continues through the rest of the translations until the desired final position is reached at "K". FIG. 9 depicts translations of Object 110) in a +X horizontal mode from "A–C", vertical −Y mode "C–E", combined +X & +/−Y moves in "E–I", and another +X horizontal move in "I–K". The distance between the moves of Object 110 have been shown greatly separated for ease of explanation and clarity. In an actual translation on ELP 40 however, EMs 100 would be shifted in much smaller adjacent type of increments and moves, in order to achieve a very smooth and fluid movement of Object 110. This type of translation is simply called "blinking" translation.

The second method of movement is actually a refinement or modification to the above concept. It accomplishes basically the same function yet allows for the EMs to fade in their intensity of attractive force to allow a much smoother and more controlled flow of the object from position to position. In this operation the EMs are energized and holding the object to the ELP, when the object is to be moved a gradual decrease in the holding EMs force will be replaced by an increased force in the new "positioning" EMs. In other words, some of the EMs are reduced in holding power and some are increased in a vice versa fashion. This may permit additional control and a more refined method of moving objects on the ELP, in what is termed a "fading blink" translation.

The third method of movement is another refinement or modification to the two concepts above. It accomplishes the same functions by allowing the EMs to fade not only in their intensity of attractive force but to change polarity as well. By having an active magnetic system (permanent magnets, permanent magnetic field, or EMs) associated with the attracted object you can take advantage of reversing the current of the EM, which changes its polarity field from a (−) to a (+) or vice versa. The ability to change the EMs polarity is a critical feature, because coupled with a permanent magnetic field (in the attractive object), now allows the EMs to either "push" or "pull" on the object. This depends on whether the EM is attracting an "opposite pole" or repelling a "like" pole, thus the "pull or push" ability. This may allow an even smoother and more controlled flow of the object from position to position. In this operation for example, the EMs are energized and holding the object to the ELP, when the object is to be moved a gradual reverse in the polarity of the holding EMs "pulling" force will now be replaced as a "pushing" force. In other words, some of the EMs holding power is "pulling" and some are "pushing" in a vice versa fashion. This may permit additional control and a more refined method of moving objects on the ELP, in what is termed a "push-pull blink" translation. Note; the EMs can also fade in their attractive intensity as well, during the "push-pull" blink translation. Another benefit to this "push-pull" blink, is that as the EMs reverse polarity and begin to "push" the attracted object, this reduces the coefficient of friction between the Attracted Object 110 and the Slip Plate 120 even further, this results in a smoother and reduced friction translation of the Attracted Objects 110.

Of paramount importance to the translation of objects on the ELP is a very small coefficient of friction between the attracted object and the surface of the ELP itself. With a smooth near frictionless surface it will allow the ELP to move objects, especially humans, with little or no perception of physically moving. Of course this may require a safety device to eliminate injury to the soldier in the case of a power failure or malfunction. The soldier would then be literally standing on a sheet of "ice". To alleviate this problem, a safety belt could be attached to the soldier, yet this inhibits and restrains the soldier and is getting away from the scope of the original intent, which is to be as close to real life as possible. Most soldiers don't run around the battlefield with a safety harness attached to them.

Another option would be to place protective mats around the area where the infantryman is operating, since he requires very little actual locomotive area this may be an acceptable solution. The mats are entirely removed from the soldier, he can't see them, yet they provide protection from falls in the immediate area. Another approach would be a means of making the "ice" turn into "real" ground instantaneously. This would be a more complex system, yet deserves discussion because of its passive, unobtrusive, and desirable hands-off capability. This system would be based on using solenoids (for example), the principal behind it, is to space electrically operated solenoids throughout the ELP, which when de-energized protrude small surfaces (or patterns) just slightly above the surface of the slip plate on the ELP. These surfaces would have a non-slip texture and would facilitate the gripping of the boots or other body parts and provide a secure walking or running surface over the "ice". These solenoids would be sized to impart only enough tread area to be effective, yet not so much as they would impair or hinder the placement and function of the EMs. When power is supplied to them they could be in a retracted mode and when power is shut off they would extend, thus if there is a power failure they automatically spring up and lock. If there was a computer malfunction and the EMs where behaving erratically, the solenoids could also be activated to form the non-slip surface for the safety of the human. The safety systems would not be dependent upon any outside power for activation, only the lack of it.

It will be readily seen by one of ordinary skill in the art that the present invention fulfills all of the objects set forth above. After reading the foregoing specification, one of ordinary skill will be able to effect various changes, substitutions of equivalents and various other aspects of the present invention as broadly disclosed herein. It is therefore intended that the protection granted hereon be limited only by the definition contained in the appended claims and equivalents thereof Having thus shown and described what is at present considered to be the preferred embodiment of the present invention, it should be noted that the same has been made by way of illustration and not limitation. Accordingly, all modifications, alterations and changes coming within the spirit and scope of the present invention are herein meant to be included.

I claim:

1. A device for the translation of an object having a ferrous content comprising:
   a structure having a plurality of cavities therein;
   a plurality of electromagnets located within a portion of said cavities;
   a low friction surface upon a portion of said structure;
   means for controlling said plurality of electromagnets such that said object can be translated along said low friction surface.

2. The device of claim 1 wherein said structure comprises a platform having a flat surface.

3. The device of claim 2 wherein said low friction surface is located on said flat surface.

4. The device of claim 3 further inOcluding a plurality of sensors located within a portion of said cavities, said sensors providing an indication to said controlling means as to the position of said object.

5. The device of claim 4 wherein said low friction surface comprises a surface having a plurality of micro ball bearings.

6. The device of claim 4 wherein said low friction surface comprises an air cushion table.

7. The device of claim 4 wherein said structure has a honeycomb shape.

8. A system for translation and immersion of a person into a virtual environment comprising:
   a platform having a flat horizontal surface, a plurality of electromagnets located below said flat horizontal surface, and a low friction surface located upon said flat horizontal surface;
   a visual interface for displaying a virtual scene to said person;
   a plurality of ferrous items located on said person for interacting with said plurality of electromagnets;
   means for controlling said plurality of electromagnets to attract and repel said plurality of ferrous items located on said person such that said person is able to move on said platform to thereby simulate movement in said virtual environment.

9. The system of claim 8 further comprising:
   means for calibrating the movements of said person prior to said person moving on said platform.

10. The system of claim 9 wherein said means for calibrating comprises a second platform having a plurality of sensors connected to said means for controlling said electromagnets.

11. The system of claim 10 further comprising means for providing virtual reality steps for said person.

12. The system of claim 10 wherein said plurality of ferrous items comprises ferrous plates in the soles of a pair of shoes worn by said person.

13. The system of claim 12 further comprising means for said person to send a signal to said means for controlling said plurality of electromagnets.

14. A method for immersion of a person into a virtual environment comprising the steps of:
   calibrating a persons movements by:
   1. placing one of said persons feet on a calibration platform having a plurality of sensors connected to a computer;
   2. having said person take a series of steps on said calibration platform;
   3. having said computer calculate a calibrated step for said person;
   placing said person on a movement platform having a flat horizontal surface, a plurality of electromagnets located below said flat horizontal surface, and a low friction surface located upon said flat horizontal surface;
   providing a visual interface for displaying a virtual scene to said person;
   providing a plurality of ferrous items located on said person for interacting with said plurality of electromagnets;
   having said computer control said electromagnets to attract and repel said ferrous items in response to movement by said person;
   allowing said person move on said movement platform in response to said virtual scene to thereby immerse said person into said virtual environment.

* * * * *